US008850657B1

(12) United States Patent
Yang

(10) Patent No.: US 8,850,657 B1
(45) Date of Patent: Oct. 7, 2014

(54) CASTOR ASSEMBLY

(71) Applicant: Feng-Hsi Yang, Tainan (TW)

(72) Inventor: Feng-Hsi Yang, Tainan (TW)

(73) Assignee: Sunny Castors Co., Ltd., Tainan Hsien (TW)

( * ) Notice: Subject to any disclaimer, the term of this patent is extended or adjusted under 35 U.S.C. 154(b) by 0 days.

(21) Appl. No.: 13/872,337

(22) Filed: Apr. 29, 2013

(51) Int. Cl.
*B60B 33/00* (2006.01)
(52) U.S. Cl.
CPC .................................. *B60B 33/0078* (2013.01)
USPC ............................... 16/35 R; 16/18 R; 16/47
(58) Field of Classification Search
USPC ............. 16/35 R, 18 R, 45, 46, 47, 48, 20, 30
See application file for complete search history.

(56) References Cited

U.S. PATENT DOCUMENTS

| 5,184,373 | A  | * | 2/1993 | Lange | 16/35 R |
|---|---|---|---|---|---|
| 5,242,035 | A  | * | 9/1993 | Lange | 16/35 R |
| 5,774,936 | A  | * | 7/1998 | Vetter | 16/35 R |
| 6,584,641 | B1 | * | 7/2003 | Milbredt | 16/35 R |
| 7,506,404 | B2 | * | 3/2009 | Block et al. | 16/35 R |
| 2004/0117943 | A1 | * | 6/2004 | Block et al. | 16/18 R |

* cited by examiner

*Primary Examiner* — Jeffrey O Brien
(74) *Attorney, Agent, or Firm* — Alan Kamrath; Kamrath IP Lawfirm, P.A.

(57) ABSTRACT

A castor assembly includes a castor unit, a positioning unit, and a brake unit. The castor unit includes a housing and two rollers. The housing has a neck portion and a body portion. The positioning unit includes a fixing block located under the neck portion, a toothed plate pivotally connected with the body portion, and two restoring springs biased between the toothed plate and the body portion. The fixing block has an annular toothed portion. The toothed plate has a plurality of locking teeth that are movable to engage the toothed portion. The brake unit includes a braking block having two braking faces press the rollers. Thus, the toothed plate presses the fixing block by the elastic force of the restoring springs so that the locking teeth of the toothed plate engage the toothed portion of the fixing block closely.

9 Claims, 8 Drawing Sheets

CASTOR ASSEMBLY

BACKGROUND OF THE INVENTION

1. Field of the Invention

The present invention relates to a castor and, more particularly, to a castor assembly for a wheeled vehicle, such as a cart, trolley, chair, wheelchair, medical bed, cabinet, shelf and the like.

2. Description of the Related Art

A conventional castor assembly comprises an upright shaft, a mounting bracket pivotally mounted on the shaft, and a roller rotatably mounted on the mounting bracket. The shaft is mounted on the bottom of a wheeled vehicle, such as a cart, trolley, chair, wheelchair, medical bed, cabinet, shelf and the like. In practice, when the castor assembly is moved, the roller is rotated on the mounting bracket, and the mounting bracket is swiveled on the shaft. Thus, the castor assembly is moved freely so as to support and move the object. However, when the roller is braked by a braking mechanism, the mounting bracket is still swiveled relative to the shaft, so that the roller is turned freely.

BRIEF SUMMARY OF THE INVENTION

In accordance with the present invention, there is provided a castor assembly, comprising a castor unit, a positioning unit connected with the castor unit, and a brake unit connected with the castor unit. The castor unit includes a housing, an outer shell mounted on the housing, and two rollers rotatably mounted on the housing. The housing of the castor unit has a first end provided with a neck portion and a second end provided with a body portion. The neck portion of the housing has a lower part provided with a first mounting bracket. The body portion of the housing has a lower part provided with a second mounting bracket. The positioning unit includes a fixing block located under the neck portion of the housing, a toothed plate pivotally connected with the body portion, and two restoring springs each biased between the toothed plate and the body portion of the housing. The fixing block of the positioning unit has an outer wall provided with an annular toothed portion. The fixing block of the positioning unit has a bottom provided with at least one locking groove. The fixing block of the positioning unit has a through hole. The toothed plate of the positioning unit has a side provided with a plurality of locking teeth that are movable to engage the toothed portion of the fixing block. The brake unit includes a braking block movably mounted on the housing of the castor unit. The braking block of the brake unit has two braking faces that are movable to press the rollers of the castor unit respectively. The braking block of the brake unit has a top face abutting a bottom of the toothed plate. The braking block of the brake unit has an interior provided with a receiving chamber, and the fixing block of the positioning unit is received in the receiving chamber of the braking block. The receiving chamber of the braking block has a bottom provided with at least one locking piece that is detachably locked in the locking groove of the fixing block.

According to the primary advantage of the present invention, the toothed plate presses the fixing block by the elastic force of the restoring springs so that the locking teeth of the toothed plate engage the toothed portion of the fixing block closely and tightly.

According to another advantage of the present invention, the restoring springs provide a buffering function to the toothed plate when the toothed plate touches the fixing block so that the locking teeth of the toothed plate engage the toothed portion of the fixing block exactly and smoothly.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
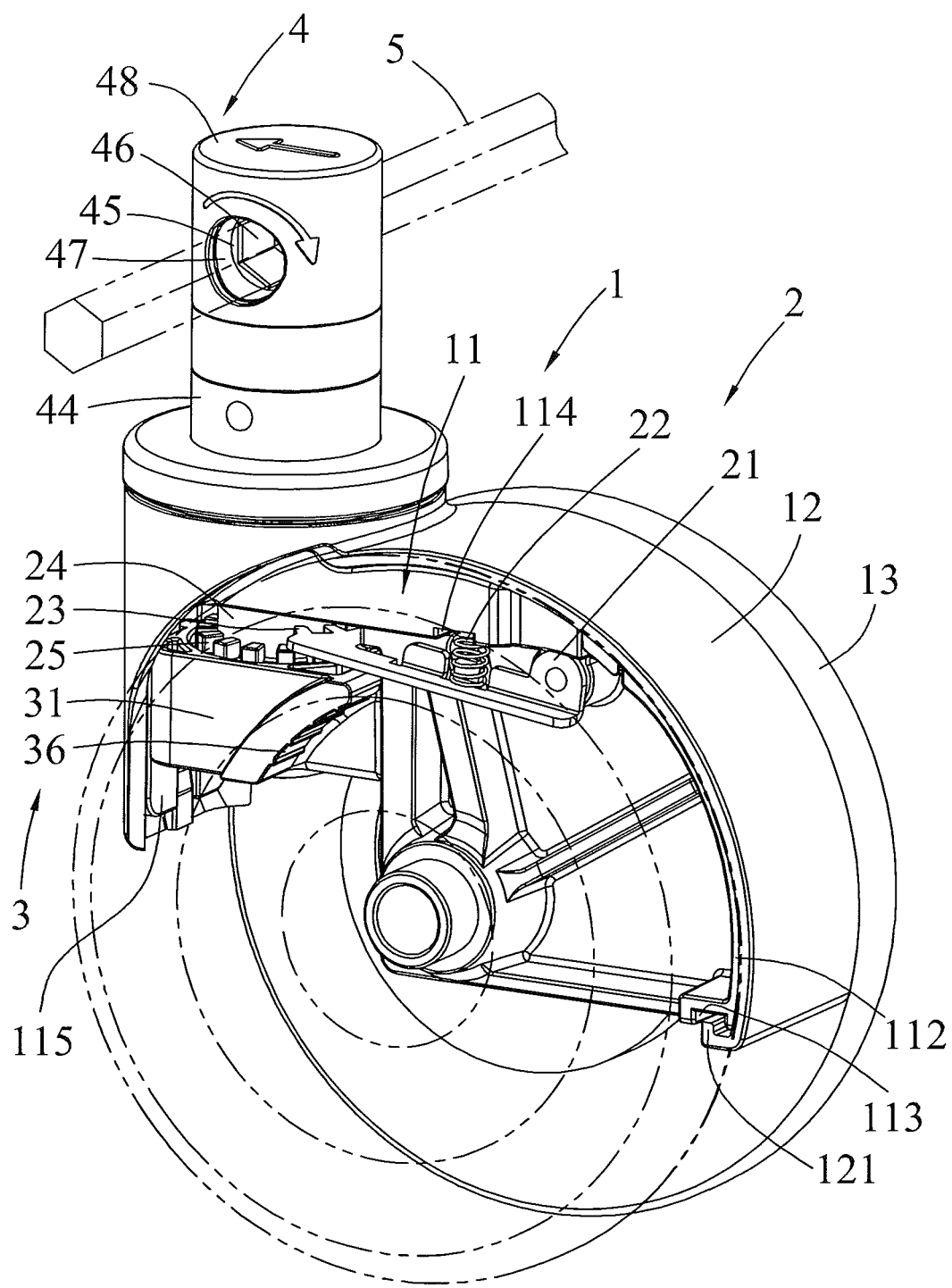
FIG. 1 is a perspective view of a castor assembly in accordance with the preferred embodiment of the present invention.

Referring to the drawings and initially to FIGS. 1-5, a castor assembly in accordance with the preferred embodiment of the present invention comprises a castor unit 1, a positioning unit 2 connected with the castor unit 1, a brake unit 3 connected with the castor unit 1, and a manipulation unit 4 connected with the brake unit 3.

The castor unit 1 includes a housing 11, an outer shell 12 mounted on the housing 11, and two rollers 13 rotatably mounted on the housing 11. The housing 11 of the castor unit 1 has a first end provided with a neck portion 111 and a second end provided with a body portion 112. The neck portion 111 of the housing 11 has a lower part provided with a first mounting bracket 115. The body portion 112 of the housing 11 is an arc-shaped plate and has a lower part provided with a second mounting bracket 1150. The first mounting bracket 115 of the housing 11 has a sidewall provided with a slideway 116. The second mounting bracket 1150 of the housing 11 has a sidewall provided with a guide rail 117. The body portion 112 of the housing 11 is provided with two mounting recesses 114. The body portion 112 of the housing 11 has a distal end provided with a locking cavity 113. The outer shell 12 of the castor unit 1 has a distal end provided with a locking hook 121 snapped into the locking cavity 113 of the housing 11. The rollers 13 of the castor unit 1 are rotatably mounted on the second mounting bracket 1150 of the body portion 112.

The positioning unit 2 is mounted on the housing 11 of the castor unit 1 and includes a fixing block 24 located under the neck portion 111 of the housing 11, a toothed plate 21 pivotally connected with the second mounting bracket 1150 of the body portion 112, and two restoring springs 22 each biased between the toothed plate 21 and the body portion 112 of the housing 11.

The fixing block 24 of the positioning unit 2 has an outer wall provided with an annular toothed portion 25. The fixing block 24 of the positioning unit 2 has a bottom provided with at least one locking groove 26. The fixing block 24 of the positioning unit 2 has a central portion provided with a through hole 27. The through hole 27 of the fixing block 24 is provided with two first flattened faces 271.

The toothed plate 21 of the positioning unit 2 is made of metal and has a substantially U-shaped profile. The toothed plate 21 of the positioning unit 2 is located above the fixing block 24 and has a side provided with a plurality of locking teeth 23 that are movable to engage the toothed portion 25 of the fixing block 24. The locking teeth 23 of the toothed plate 21 are arranged to form an arc-shaped profile.

Each of the restoring springs 22 of the positioning unit 2 has an upper end mounted in a respective one of the mounting recesses 114 of the housing 11 and a lower end abutting the toothed plate 21. Each of the restoring springs 22 of the positioning unit 2 pushes the toothed plate 21 toward the fixing block 24 so that the locking teeth 23 of the toothed plate 21 are movable to engage the toothed portion 25 of the fixing block 24.

The brake unit 3 is mounted on the housing 11 of the castor unit 1 and includes a braking block 31 movably mounted on the housing 11 of the castor unit 1, and a compression spring 321 biased between the bottom of the fixing block 24 of the positioning unit 2 and the braking block 31.

The braking block 31 of the brake unit 3 is located under the fixing block 24 of the positioning unit 2 and has two braking faces 36 that are movable to press and brake the rollers 13 of the castor unit 1 respectively. The braking block 31 of the brake unit 3 has a top face 311 abutting a bottom of the toothed plate 21. The top face 311 of the braking block 31 has a side provided with an upward protruded push lug 312 abutting the bottom of the toothed plate 21. Thus, the braking block 31 of the brake unit 3 is movable upward or downward to push or release the toothed plate 21 of the positioning unit 2 so that the locking teeth 23 of the toothed plate 21 engages or disengages the toothed portion 25 of the fixing block 24. The braking block 31 of the brake unit 3 has an interior provided with a receiving chamber 32, and the fixing block 24 of the positioning unit 2 is received in the receiving chamber 32 of the braking block 31. The receiving chamber 32 of the braking block 31 is located under the top face 311 of the braking block 31 and has a bottom provided with at least one upward protruded locking piece 33 that is detachably locked in the locking groove 26 of the fixing block 24. The braking block 31 of the brake unit 3 has a first side provided with a slide 34 slidable in the slideway 116 of the housing 11 and a second side provided with a sliding channel 35 slidable on the guide rail 117 of the housing 11.

The compression spring 321 of the brake unit 3 is received in the receiving chamber 32 of the braking block 31 to push the braking block 31 outward relative to the fixing block 24 of the positioning unit 2 and to detach the locking piece 33 of the braking block 31 from the locking groove 26 of the fixing block 24.

The manipulation unit 4 is mounted on the neck portion 111 of the housing 11 and includes an outer shaft 44 extended through the neck portion 111 of the housing 11 and the through hole 27 of the fixing block 24, an inner shaft 41 movably mounted in the outer shaft 44 and connected with the braking block 31 of the brake unit 3, a push spring 43 mounted on the inner shaft 41 and biased between the inner shaft 41 and the outer shaft 44, a driven boss 42 formed on and protruded from a top of the inner shaft 41, two juxtaposed casings 47 connected with the outer shaft 44, a pressing wheel 45 rotatably mounted between the casings 47 and pressing the driven boss 42, a limit piece 471 secured between the casings 47, a cover 48 mounted on the casings 47, and a driving bar 5 extended through the pressing wheel 45 to rotate the pressing wheel 45 relative to the driven boss 42.

The outer shaft 44 of the manipulation unit 4 protrudes outward from the neck portion 111 of the housing 11. The outer shaft 44 of the manipulation unit 4 has a cylindrical shape and has a lower end combined with the fixing block 24 of the positioning unit 2 so that the fixing block 24 of the positioning unit 2 is secured on the outer shaft 44 of the manipulation unit 4. The lower end of the outer shaft 44 is provided with two second flattened faces 441 abutting the first flattened faces 271 of the fixing block 24 so that the fixing block 24 is fixed on the outer shaft 44.

The inner shaft 41 of the manipulation unit 4 extends through the outer shaft 44, the compression spring 321 of the brake unit 3 and the receiving chamber 32 of the braking block 31. The inner shaft 41 of the manipulation unit 4 has a cylindrical shape and has a lower end combined with the bottom of the braking block 31.

The push spring 43 of the manipulation unit 4 has an upper end abutting an enlarged upper end of the inner shaft 41 and a lower end abutting a stepped shoulder of the outer shaft 44. The push spring 43 of the manipulation unit 4 has an elastic force greater than that of the compression spring 321 of the brake unit 3.

The pressing wheel 45 of the manipulation unit 4 has a periphery 450 that is movable to press the driven boss 42. The periphery 450 of the pressing wheel 45 is provided with a plurality of receiving grooves 451 that are movable to receive the driven boss 42. The receiving grooves 451 of the pressing wheel 45 have different depth. The pressing wheel 45 of the manipulation unit 4 has an interior provided with a polygonal driving hole 46. The periphery 450 of the pressing wheel 45 is provided with an elongate limit slot 452, and the limit piece 471 of the manipulation unit 4 is received in the limit slot 452 of the pressing wheel 45 to limit rotation of the pressing wheel 45.

The driving bar 5 of the manipulation unit 4 is extended through the cover 48, the casings 47 and the driving hole 46 of the pressing wheel 45. Preferably, the driving bar 5 of the manipulation unit 4 has a polygonal shape.

In assembly, the push spring 43 is mounted on the inner shaft 41. Then, the inner shaft 41 is inserted into the outer shaft 44, with the push spring 43 being biased between the inner shaft 41 and the outer shaft 44. Then, the outer shaft 44 extends through the neck portion 111 of the housing 11. Then, the toothed plate 21 is pivotally connected with the second mounting bracket 1150 of the body portion 112, with the restoring springs 22 being biased between the toothed plate 21 and the body portion 112 of the housing 11. At this time, the locking teeth 23 of the toothed plate 21 is located under the neck portion 111 of the housing 11. Then, the through hole 27 of the fixing block 24 is forcibly fitted onto the outer shaft 44 so that the fixing block 24 is fixed on the outer shaft 44. At this time, the toothed portion 25 of the fixing block 24 is located under the locking teeth 23 of the toothed plate 21. Then, the braking block 31 is mounted on the housing 11 of the castor unit 1, with the slide 34 of the braking block 31 being inserted into the slideway 116 of the housing 11, and with the sliding channel 35 of the braking block 31 being mounted on the guide rail 117 of the housing 11. At this time, the fixing block 24 of the positioning unit 2 is received in the receiving chamber 32 of the braking block 31, with the compression spring 321 being biased between the bottom of the fixing block 24 of the positioning unit 2 and the braking block 31. Then, the inner shaft 41 of the manipulation unit 4 extends through the outer shaft 44, the compression spring 321 of the brake unit 3 and the receiving chamber 32 of the braking block 31. Then, the lower end of the inner shaft 41 is protruded outward from and combined with the bottom of the braking block 31 by a fastening member so that the braking block 31 is combined with the inner shaft 41. Then, the rollers 13 are mounted on the second mounting bracket 1150 of the housing 11. Then, the outer shell 12 is mounted on the housing 11, with the locking hook 121 being snapped into the locking cavity 113 of the housing 11. Then, the pressing wheel 45 is placed on the inner shaft 41 and the outer shaft 44, and the casings 47 are connected with the outer shaft 44, with the pressing wheel 45 being surrounded by the casings 47, and with the limit piece 471 being secured between the casings 47. Then, the cover 48 is mounted on the casings 47. Finally, the driving bar 5 is extended through the cover 48, the casings 47 and the driving hole 46 of the pressing wheel 45 to drive and rotate the pressing wheel 45 relative to the driven boss 42.

In operation, the manipulation unit 4 can operate the castor unit 1 so that the castor unit 1 is operated in three different operation modes by control of the manipulation unit 4.

Figure 2:
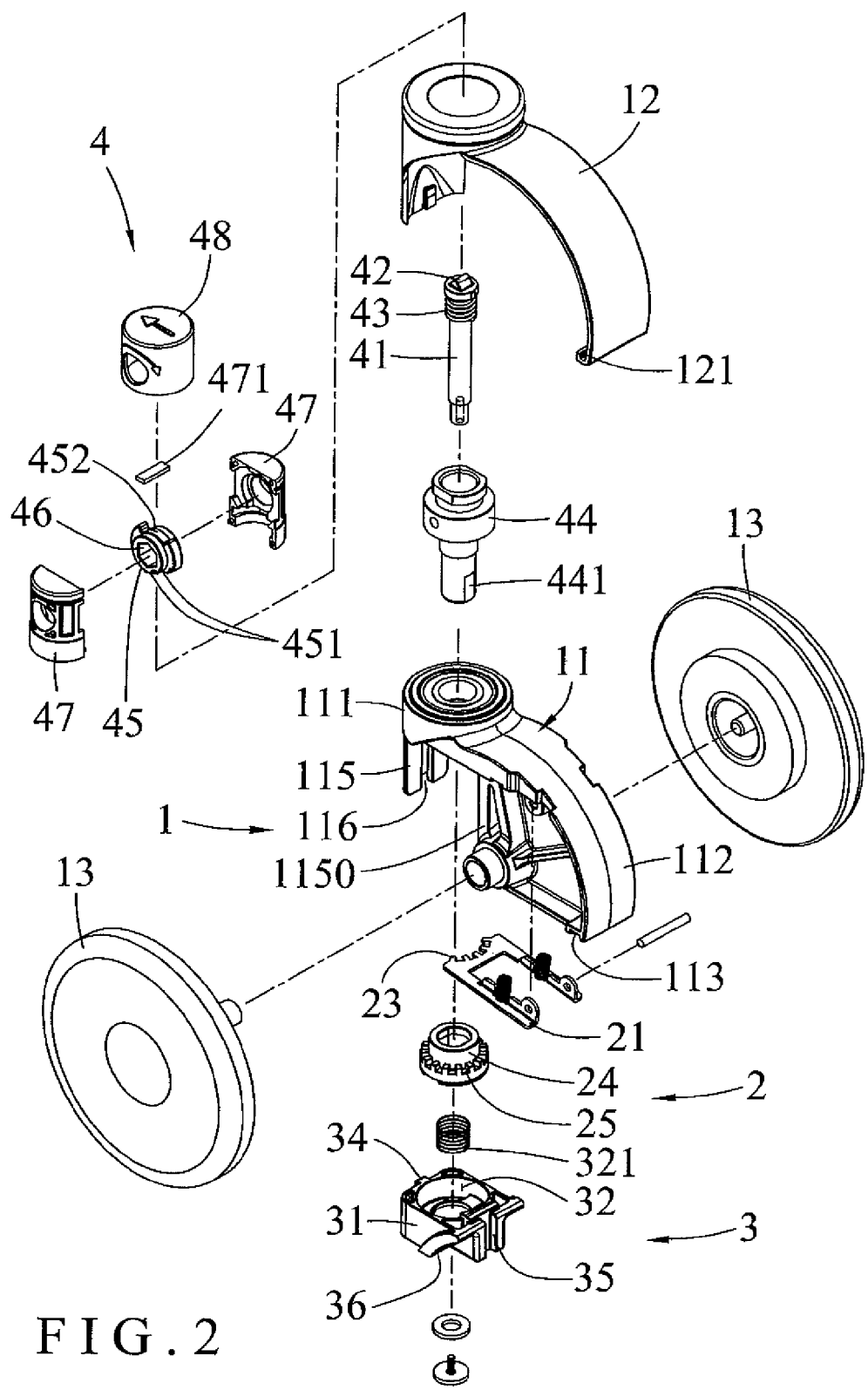
FIG. 2 is an exploded perspective view of the castor assembly as shown in FIG. 1.
Figure 3:
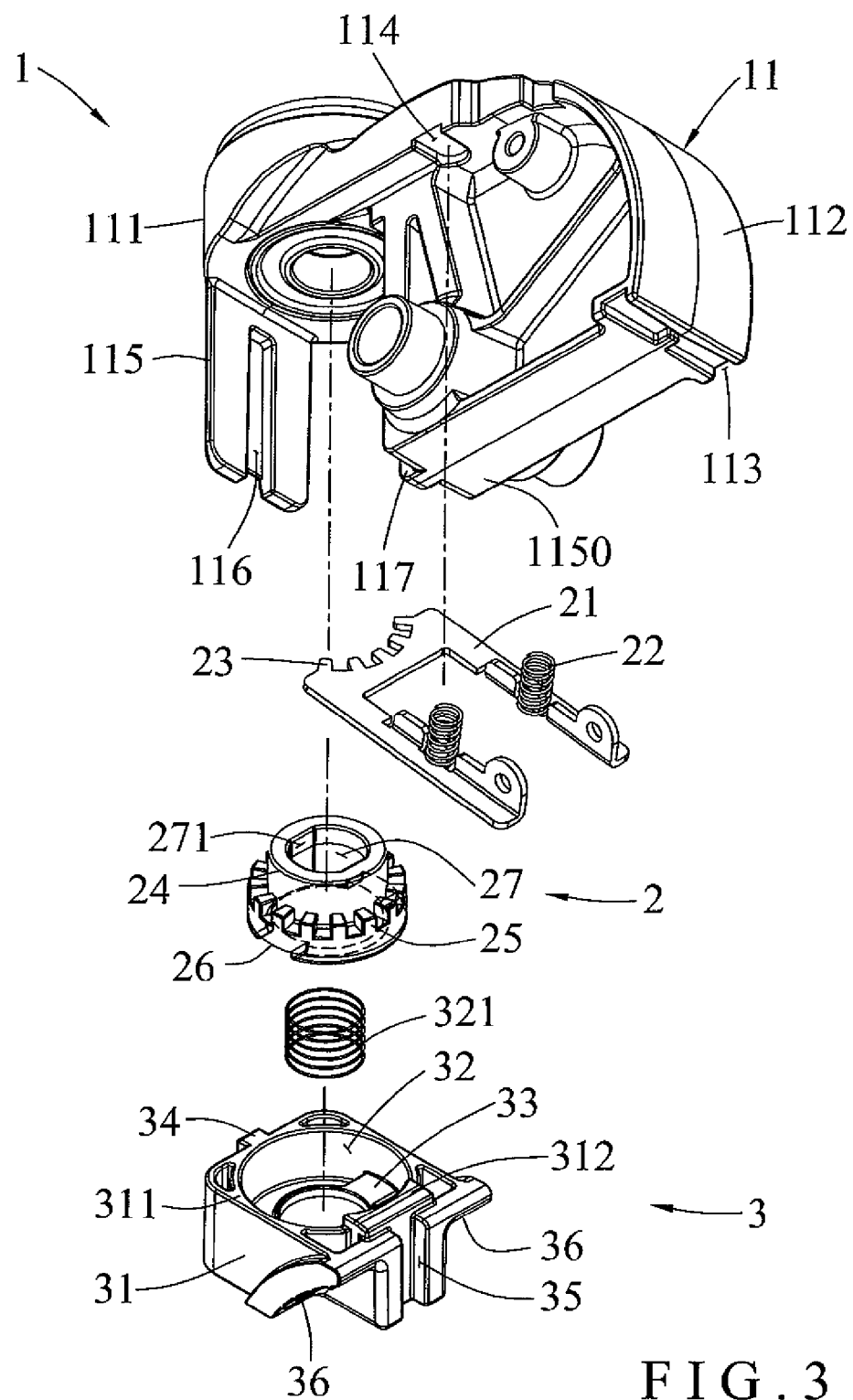
FIG. 3 is a partially perspective view of the castor assembly as shown in FIG. 1.
Figure 4:
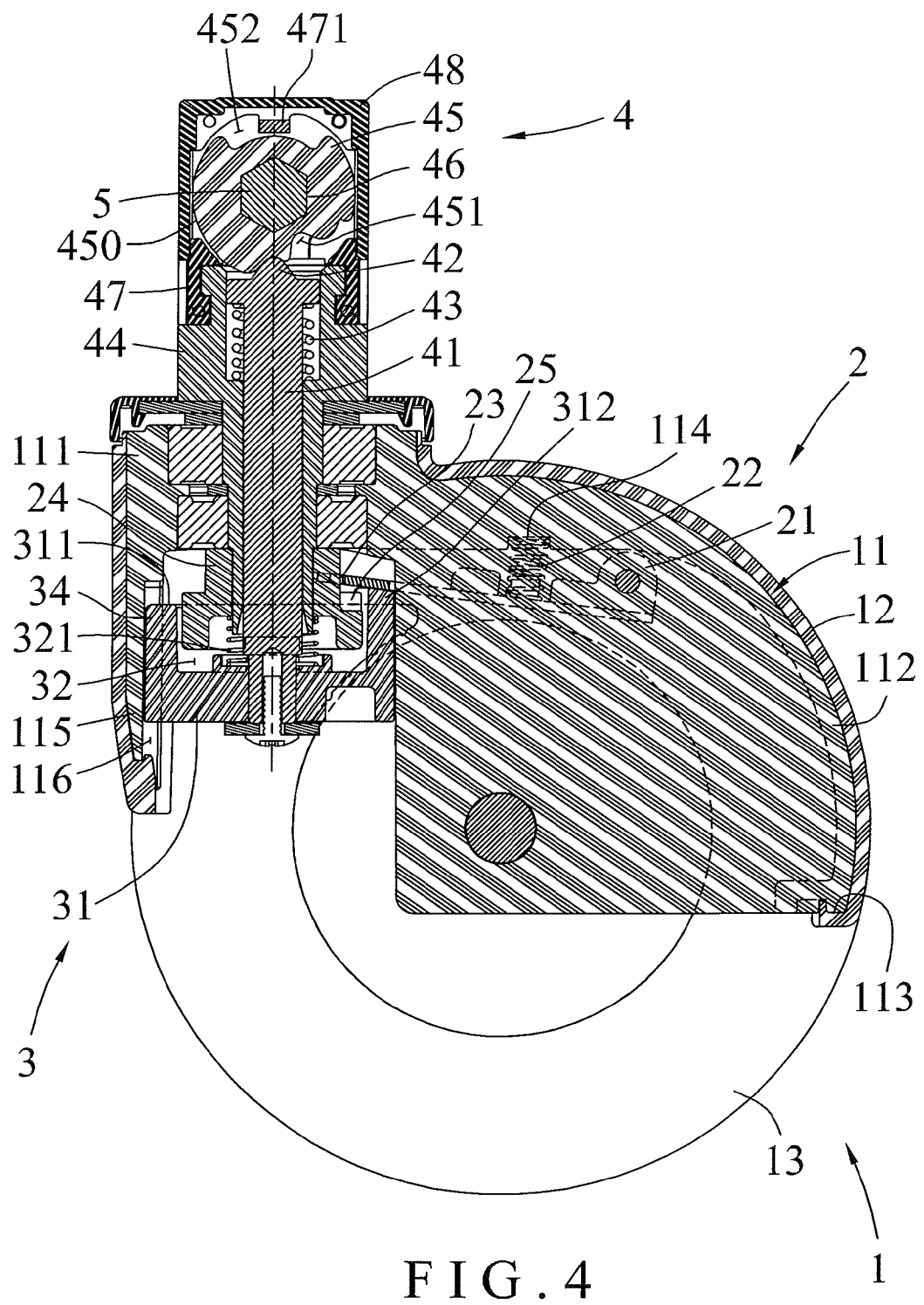
FIG. 4 is a side cross-sectional view of the castor assembly as shown in FIG. 1.
Figure 5:
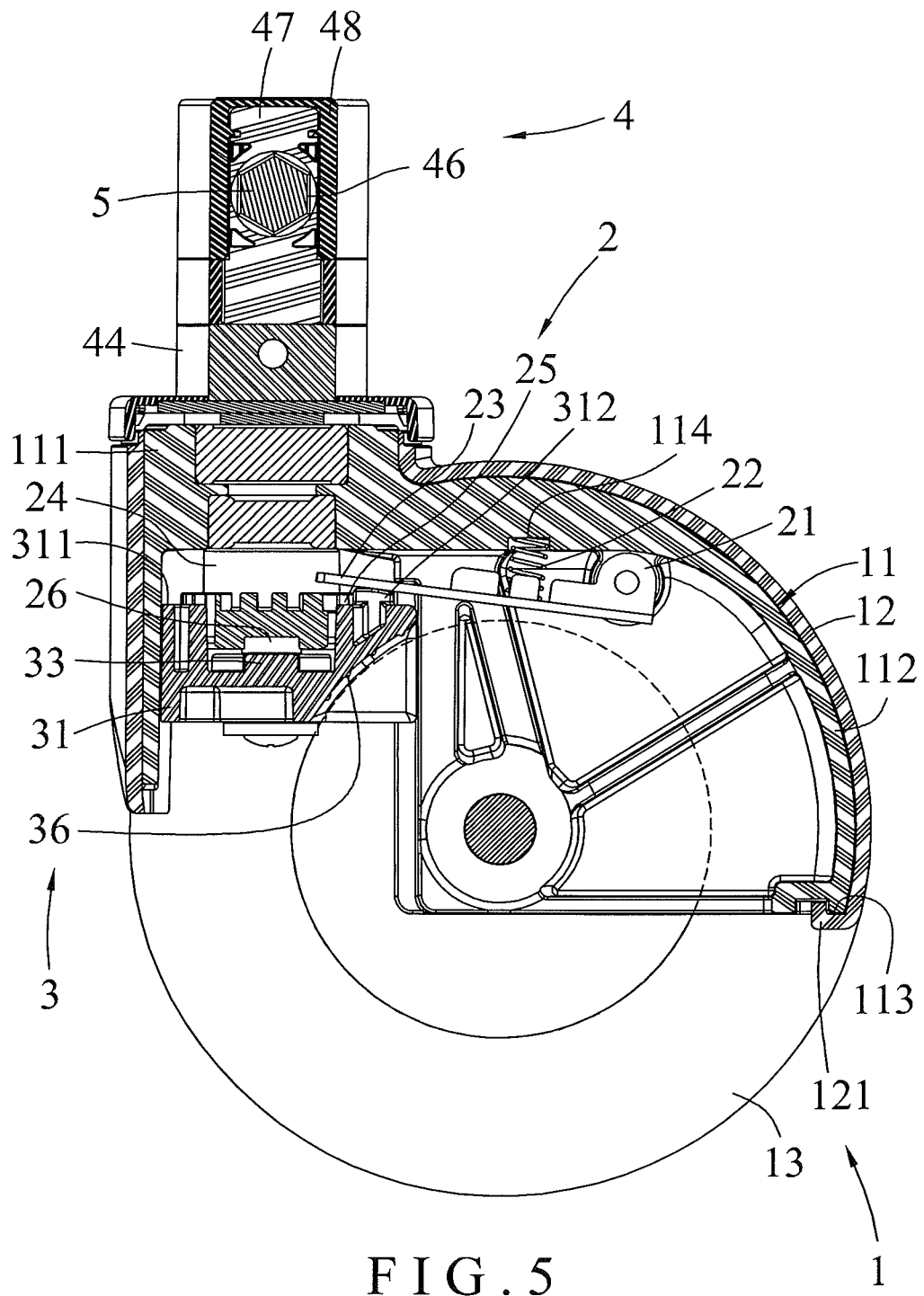
FIG. 5 is another side cross-sectional view of the castor assembly as shown in FIG. 1.

Referring to FIGS. 4 and 5 with reference to FIGS. 1-3, the castor unit 1 is disposed at a first operation mode. At this time, the pressing wheel 45 is rotated until the driven boss 42 is received in one of the receiving grooves 451 having a smaller depth as shown in FIG. 4. The compression spring 321 is biased between the fixing block 24 and the braking block 31 to detach the locking piece 33 of the braking block 31 from the locking groove 26 of the fixing block 24. The push lug 312 of the braking block 31 pushes the toothed plate 21 upward to compress the restoring springs 22 so that the locking teeth 23 of the toothed plate 21 disengages the toothed portion 25 of the fixing block 24 as shown in FIG. 5. In such a manner, the braking block 31 is unlocked from the fixing block 24 so that the housing 11 can be swiveled relative to the outer shaft 44. In addition, the braking faces 36 of the braking block 31 are detached from the rollers 13 of the castor unit 1 as shown in FIG. 5. Thus, the rollers 13 can be moved forward and backward and can be turned freely.

Figure 6:
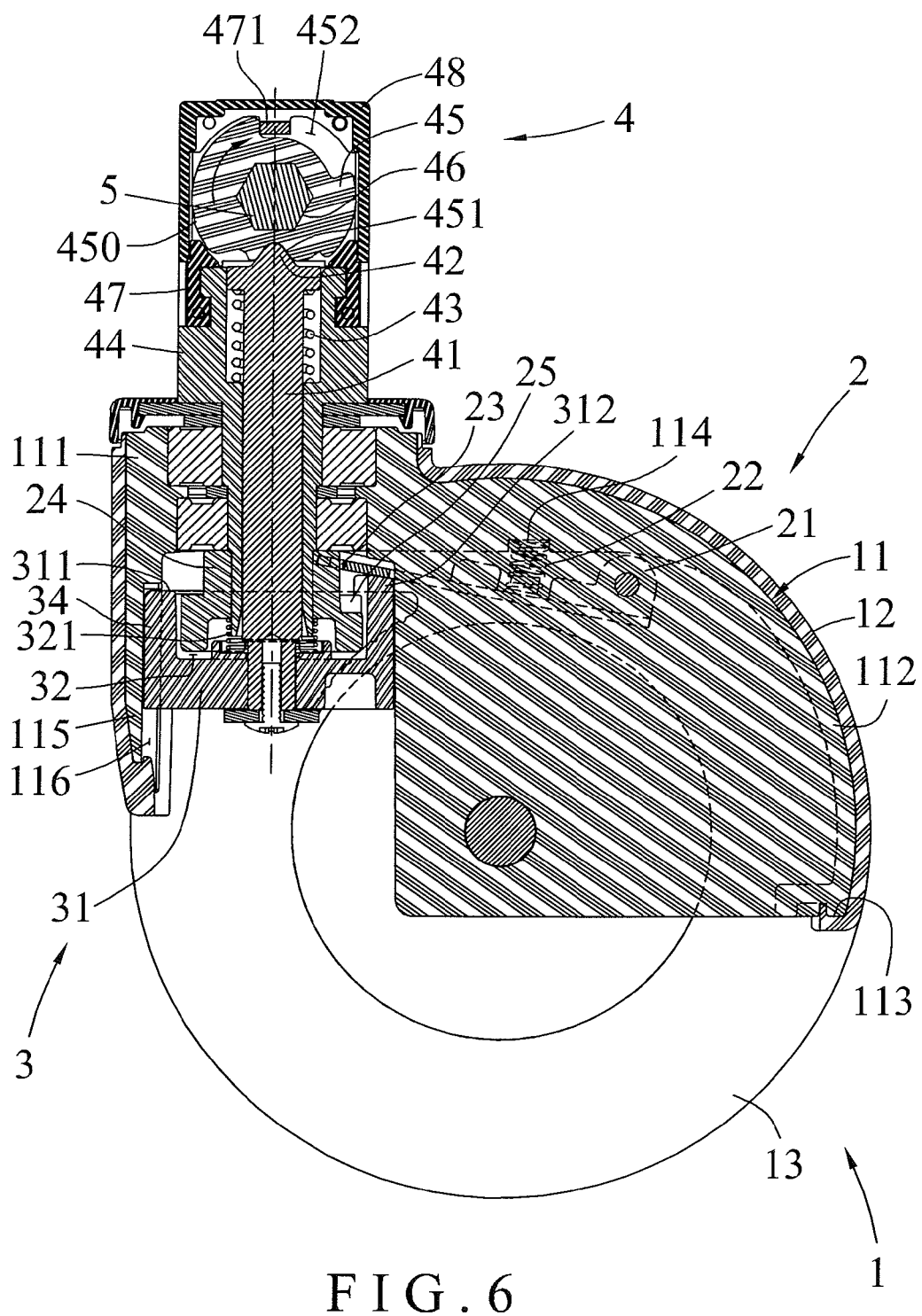
FIG. 6 is a schematic operational view of the castor assembly as shown in FIG. 4.
Figure 7:
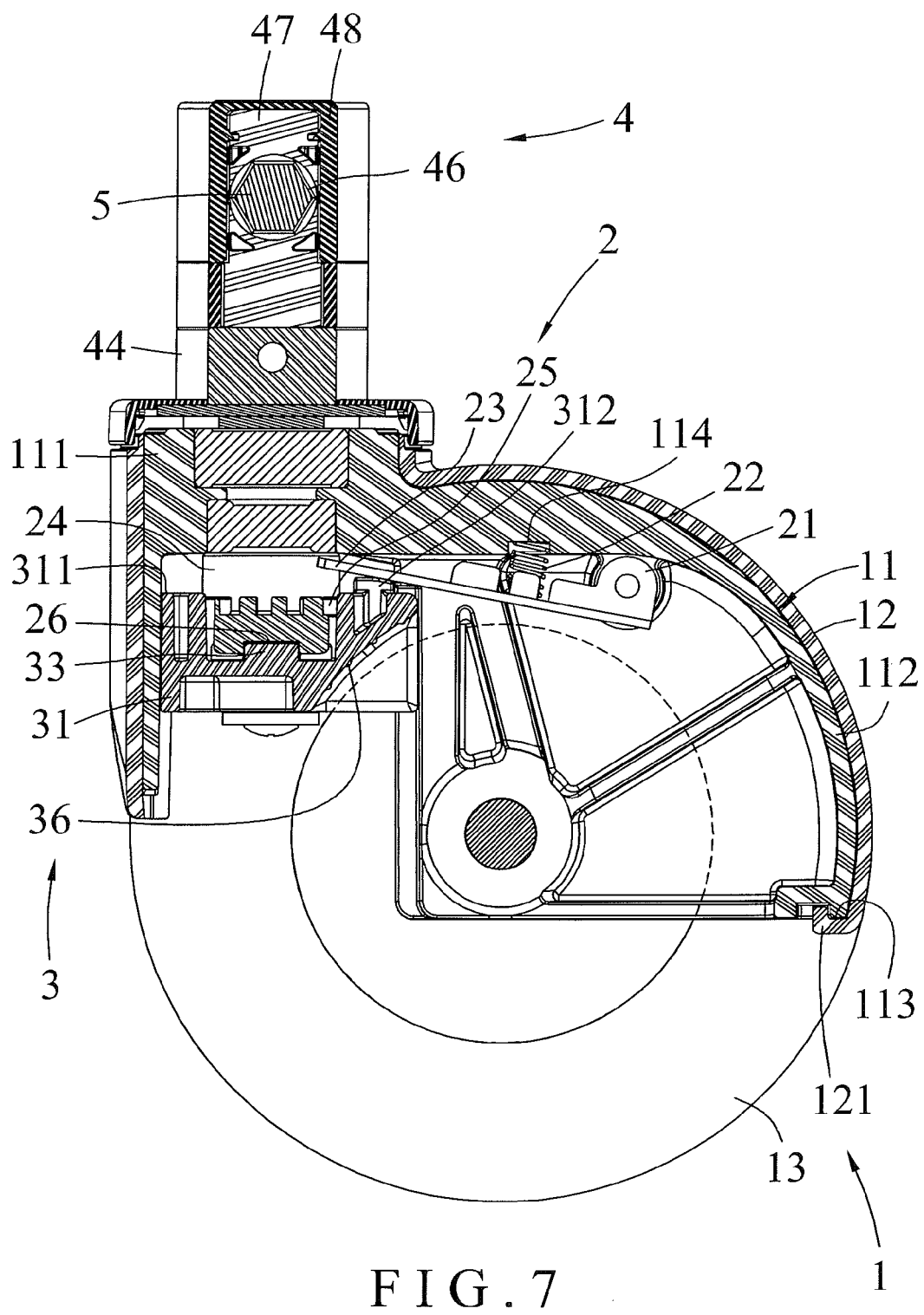
FIG. 7 is a schematic operational view of the castor assembly as shown in FIG. 5.

Referring to FIGS. 6 and 7 with reference to FIGS. 1-3, the castor unit 1 is disposed at a second operation mode. At this time, the pressing wheel 45 is rotated until the driven boss 42 is received in another one of the receiving grooves 451 having a greater depth as shown in FIG. 6, so that the inner shaft 41 is pushed upward by the push spring 43 to lift the braking block 31. In such a manner, the braking block 31 is moved toward the fixing block 24 to compress the compression spring 321, and the locking piece 33 of the braking block 31 is inserted into and locked in the locking groove 26 of the fixing block 24 as shown in FIG. 7 so that the braking block 31 is locked onto the fixing block 24, and the housing 11 is locked by the fixing block 24 and cannot be swiveled relative to the outer shaft 44. In addition, the braking faces 36 of the braking block 31 are detached from the rollers 13 of the castor unit 1 as shown in FIG. 7. Thus, the rollers 13 can be moved forward and backward but cannot be turned about any more.

Figure 8:
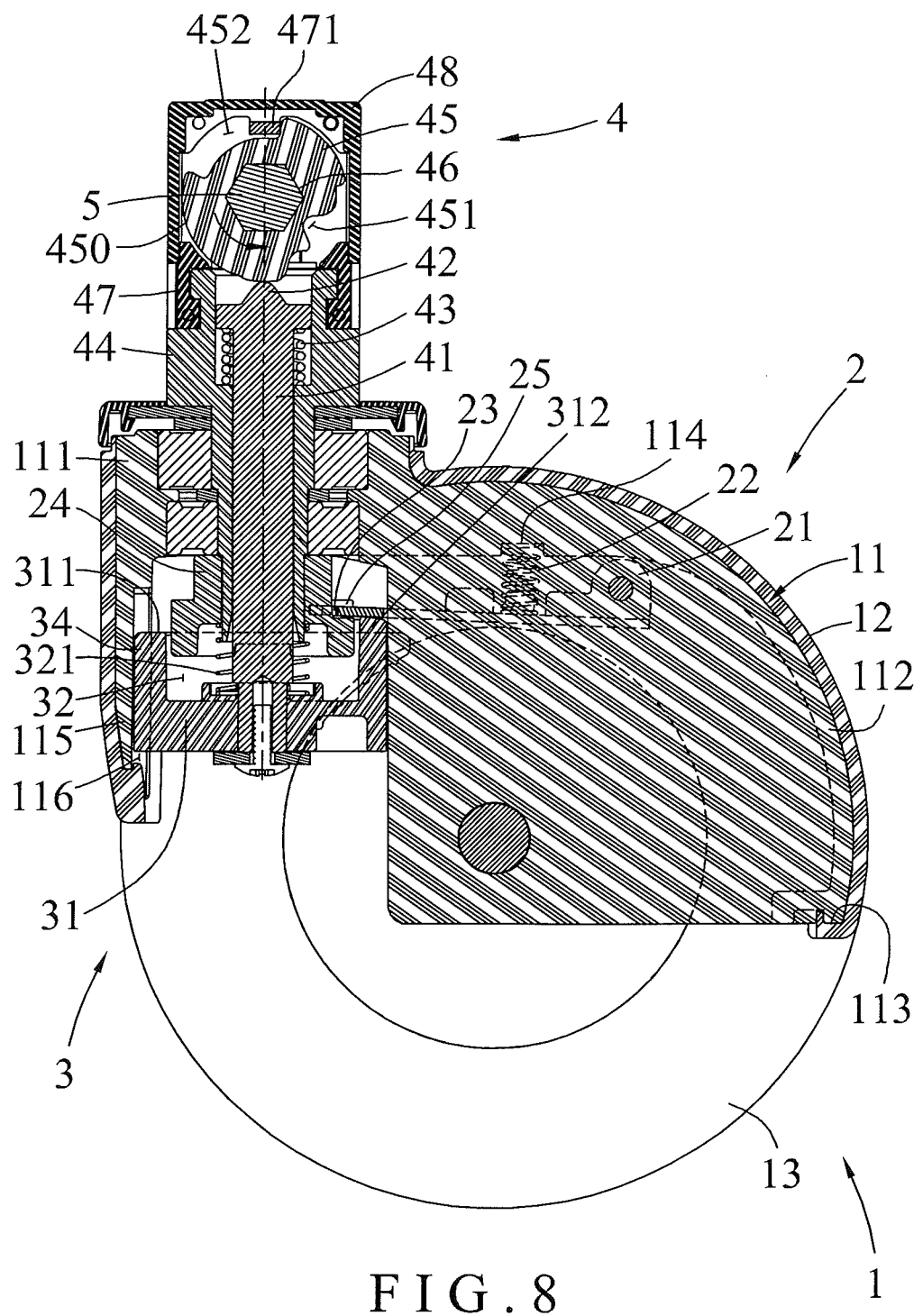
FIG. 8 is a schematic operational view of the castor assembly as shown in FIG. 4.

Referring to FIG. 8 with reference to FIGS. 1-3, the castor unit 1 is disposed at a third operation mode. At this time, the pressing wheel 45 is rotated until the driven boss 42 is pressed by the periphery 450 of the pressing wheel 45, so that the inner shaft 41 is moved downward to compress the push spring 43 and to push the braking block 31 downward. In such a manner, the braking block 31 is moved downward, and the braking faces 36 of the braking block 31 are moved downward to press the rollers 13 of the castor unit 1 so that the rollers 13 are braked and cannot be translated any more. When the braking block 31 is moved downward, the push lug 312 of the braking block 31 is also moved downward to release the toothed plate 21 so that the toothed plate 21 is pushed by the restoring springs 22 to move toward the fixing block 24, and the locking teeth 23 of the toothed plate 21 are moved to engage the toothed portion 25 of the fixing block 24 so as to lock the housing 11. In such a manner, the housing 11 is locked by the fixing block 24 and cannot be swiveled relative to the outer shaft 44, so that the rollers 13 are locked and cannot be turned any more. Thus, the rollers 13 cannot be translated and cannot be turned.

Accordingly, the toothed plate 21 presses the fixing block 24 by the elastic force of the restoring springs 22 so that the locking teeth 23 of the toothed plate 21 engage the toothed portion 25 of the fixing block 24 closely and tightly. In addition, the restoring springs 22 provide a buffering function to the toothed plate 21 when the toothed plate 21 touches the fixing block 24 so that the locking teeth 23 of the toothed plate 21 engage the toothed portion 25 of the fixing block 24 exactly and smoothly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A castor assembly, comprising:
a castor unit;
a positioning unit connected with the castor unit; and
a brake unit connected with the castor unit; wherein:
the castor unit includes:
a housing;
an outer shell mounted on the housing; and
two rollers rotatably mounted on the housing;
the housing of the castor unit has a first end provided with a neck portion and a second end provided with a body portion;
the neck portion of the housing has a lower part provided with a first mounting bracket;
the body portion of the housing has a lower part provided with a second mounting bracket;
the positioning unit includes:
a fixing block located under the neck portion of the housing;
a toothed plate pivotally connected with the body portion; and
two restoring springs each biased between the toothed plate and the body portion of the housing;
the fixing block of the positioning unit has an outer wall provided with an annular toothed portion;
the fixing block of the positioning unit has a bottom provided with at least one locking groove;
the fixing block of the positioning unit has a through hole;
the toothed plate of the positioning unit has a side provided with a plurality of locking teeth that are movable to engage the toothed portion of the fixing block;
the brake unit includes:
a braking block movably mounted on the housing of the castor unit;
the braking block of the brake unit has two braking faces that are movable to press the rollers of the castor unit respectively;
the braking block of the brake unit has a top face abutting a bottom of the toothed plate;
the braking block of the brake unit has an interior provided with a receiving chamber;
the fixing block of the positioning unit is received in the receiving chamber of the braking block; and the receiving chamber of the braking block has a bottom provided with at least one locking piece that is detachably locked in the locking groove of the fixing block;
the castor assembly further comprising a manipulation unit connected with the brake unit;
the manipulation unit includes:
an outer shaft extended through the neck portion of the housing and the through hole of the fixing block;
an inner shaft movably mounted in the outer shaft and connected with the braking block of the brake unit;
a push spring mounted on the inner shaft and biased between the inner shaft and the outer shaft;
a driven boss formed on and protruded from a top of the inner shaft;
two juxtaposed casings connected with the outer shaft;
a pressing wheel rotatably mounted between the casings and pressing the driven boss;
a limit piece secured between the casings;
a cover mounted on the casings; and
a driving bar extended through the pressing wheel to rotate the pressing wheel relative to the driven boss;
the pressing wheel of the manipulation unit has a periphery that is movable to press the driven boss;
the periphery of the pressing wheel is provided with a plurality of receiving grooves that are movable to receive the driven boss;
the pressing wheel of the manipulation unit has an interior provided with a driving hole;
the periphery of the pressing wheel is provided with an elongate limit slot;
the limit piece of the manipulation unit is received in the limit slot of the pressing wheel; and
the driving bar of the manipulation unit is extended through the driving hole of the pressing wheel.

2. The castor assembly of claim 1, wherein:
the first mounting bracket of the housing has a sidewall provided with a slideway;
the second mounting bracket of the housing has a sidewall provided with a guide rail; and
the braking block of the brake unit has a first side provided with a slide slidable in the slideway of the housing and a second side provided with a sliding channel slidable on the guide rail of the housing.

3. The castor assembly of claim 1, wherein:
the body portion of the housing is provided with two mounting recesses; and
each of the restoring springs of the positioning unit has an upper end mounted in a respective one of the mounting recesses of the housing and a lower end abutting the toothed plate.

4. The castor assembly of claim 1, wherein:
the body portion of the housing has a distal end provided with a locking cavity;
the outer shell of the castor unit has a distal end provided with a locking hook snapped into the locking cavity of the housing; and
the rollers of the castor unit are rotatably mounted on the second mounting bracket of the body portion.

5. The castor assembly of claim 1, wherein the toothed plate of the positioning unit is made of metal and has a substantially U-shaped profile.

6. The castor assembly of claim 1, wherein:
the brake unit further includes a compression spring biased between the bottom of the fixing block of the positioning unit and the braking block; and
the compression spring of the brake unit is received in the receiving chamber of the braking block to push the braking block outward relative to the fixing block of the positioning unit and to detach the locking piece of the braking block from the locking groove of the fixing block.

7. The castor assembly of claim 1, wherein:
the top face of the braking block has a side provided with an upward protruded push lug abutting the bottom of the toothed plate; and
the braking block of the brake unit is movable upward or downward to push or release the toothed plate of the positioning unit so that the locking teeth of the toothed plate engages or disengages the toothed portion of the fixing block.

8. The castor assembly of claim 1, wherein:
the through hole of the fixing block is provided with two first flattened faces; and
the lower end of the outer shaft is provided with two second flattened faces abutting the first flattened faces of the fixing block so that the fixing block is fixed on the outer shaft.

9. The castor assembly of claim 6, wherein:
the outer shaft of the manipulation unit protrudes outward from the neck portion of the housing;
the outer shaft of the manipulation unit has a cylindrical shape and has a lower end combined with the fixing block of the positioning unit so that the fixing block of the positioning unit is secured on the outer shaft of the manipulation unit;
the inner shaft of the manipulation unit extends through the outer shaft, the compression spring of the brake unit and the receiving chamber of the braking block; and
the inner shaft of the manipulation unit has a cylindrical shape and has a lower end combined with the bottom of the braking block.

* * * * *